US007578127B2

(12) United States Patent
Griswold

(10) Patent No.: US 7,578,127 B2
(45) Date of Patent: Aug. 25, 2009

(54) FLOW CONTINUITY FOR MULTIPLE HYDRAULIC CIRCUITS AND ASSOCIATED METHOD

(75) Inventor: Daniel A. Griswold, Chicago, IL (US)

(73) Assignee: Deere & Company, Moline, IL (US)

( * ) Notice: Subject to any disclaimer, the term of this patent is extended or adjusted under 35 U.S.C. 154(b) by 220 days.

(21) Appl. No.: 11/733,416

(22) Filed: Apr. 10, 2007

(65) Prior Publication Data

US 2008/0250783 A1 Oct. 16, 2008

(51) Int. Cl.
*E02F 9/22* (2006.01)
*F16H 61/40* (2006.01)

(52) U.S. Cl. .............................. 60/422; 60/476; 60/488

(58) Field of Classification Search ................... 60/421, 60/422, 476, 486, 488
See application file for complete search history.

(56) References Cited

U.S. PATENT DOCUMENTS 4,329,845 A * 5/1982 Parquet et al. ................ 60/422
4,332,134 A * 6/1982 Cochran et al. ............... 60/488
4,369,625 A * 1/1983 Izumi et al. .................... 60/422
4,395,878 A * 8/1983 Morita et al. ................. 60/488
4,819,429 A 4/1989 Kordak
5,819,536 A 10/1998 Mentink
6,467,264 B1 10/2002 Stephenson et al.
6,502,393 B1 1/2003 Stephenson et al.
6,584,769 B1 7/2003 Bruun
6,748,738 B2 6/2004 Smith
6,789,387 B2 9/2004 Brinkman
6,804,957 B2 10/2004 Bruun
7,234,298 B2 6/2007 Brinkman et al.
2003/0097837 A1 5/2003 Hiraki et al.
2007/0277405 A1 12/2007 Anderson et al.
2008/0082239 A1 4/2008 Anderson

OTHER PUBLICATIONS

Rahmfeld and Ivantysynova, Displacement Controlled Linear Actuator With Differential Cylinder—A Way To Save Primary Energy In Mobile Machines; Technical Univeristy of Hamburg-Harburg, Aircraft Systems Engineering, Nesspriel 5, D-21129; pp. 1-6; Hamburg, Germany.

* cited by examiner

*Primary Examiner*—Thomas E Lazo

(57) ABSTRACT

A hydraulic system comprises a plurality of primary hydraulic circuits and a secondary hydraulic circuit for satisfying flow continuity of the primary hydraulic circuits.

20 Claims, 4 Drawing Sheets

FLOW CONTINUITY FOR MULTIPLE HYDRAULIC CIRCUITS AND ASSOCIATED METHOD

FIELD OF THE DISCLOSURE

The present disclosure relates to a hydraulic system and associated method.

BACKGROUND OF THE DISCLOSURE

There are hydraulic systems which use a directional control valve to control flow to and from rod and head sides of an actuator. However, directional control valves can be quite expensive and may result in performance inefficiencies (e.g., energy/fuel inefficiencies). As a response to this issue, some hydraulic systems have been designed without a directional control valve and instead rely on a bi-directional variable displacement pump to direct flow between rod and head sides of the actuator.

In the context of hydraulic systems, flow continuity relates to the need of a hydraulic pump to experience continuity in the flow of hydraulic fluid therethrough. This requirement is implicated particularly in circuits that have been designed without a directional control valve and instead rely on a bi-directional variable displacement pump to direct flow between rod and head sides of an actuator. The unequal areas of the rod and head sides result in unequal flow volumes to and from the actuator, which, without proper accommodation, could interrupt flow continuity at the pump.

SUMMARY OF THE DISCLOSURE

According to the present disclosure, a hydraulic system comprises a plurality of primary hydraulic circuits and a secondary hydraulic circuit for satisfying flow continuity of the primary hydraulic circuits. Each primary hydraulic circuit comprises an actuator and a bi-directional variable displacement primary pump for directing hydraulic flow between ports of the actuator. The secondary hydraulic circuit is fluidly coupled to each primary hydraulic circuit and comprises a bi-directional variable displacement secondary pump. A controller for communication with the primary hydraulic circuits and the secondary hydraulic circuit is adapted to determine a flow continuity requirement of each primary hydraulic circuit and control the direction and displacement of the secondary pump so as to complement operation of each primary pump in a manner that satisfies the flow continuity requirement of each primary hydraulic circuit. An associated method is disclosed.

According to an aspect of the present disclosure, there are a plurality of input devices. Each input device is associated with one of the primary hydraulic circuits and is operable to provide an input signal representative of a request for a direction and speed of actuation of the actuator of the respective primary hydraulic circuit. The controller is adapted to determine a direction and displacement for the primary pump of each primary hydraulic circuit using the respective input signal, determine a net flow continuity requirement as a sum of the flow continuity requirements of the primary hydraulic circuits using the direction and displacement of each primary pump, and output a primary pump control signal to each primary pump commanding its direction and displacement and a secondary pump control signal to the secondary pump commanding its direction and displacement to satisfy the net flow continuity requirement.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
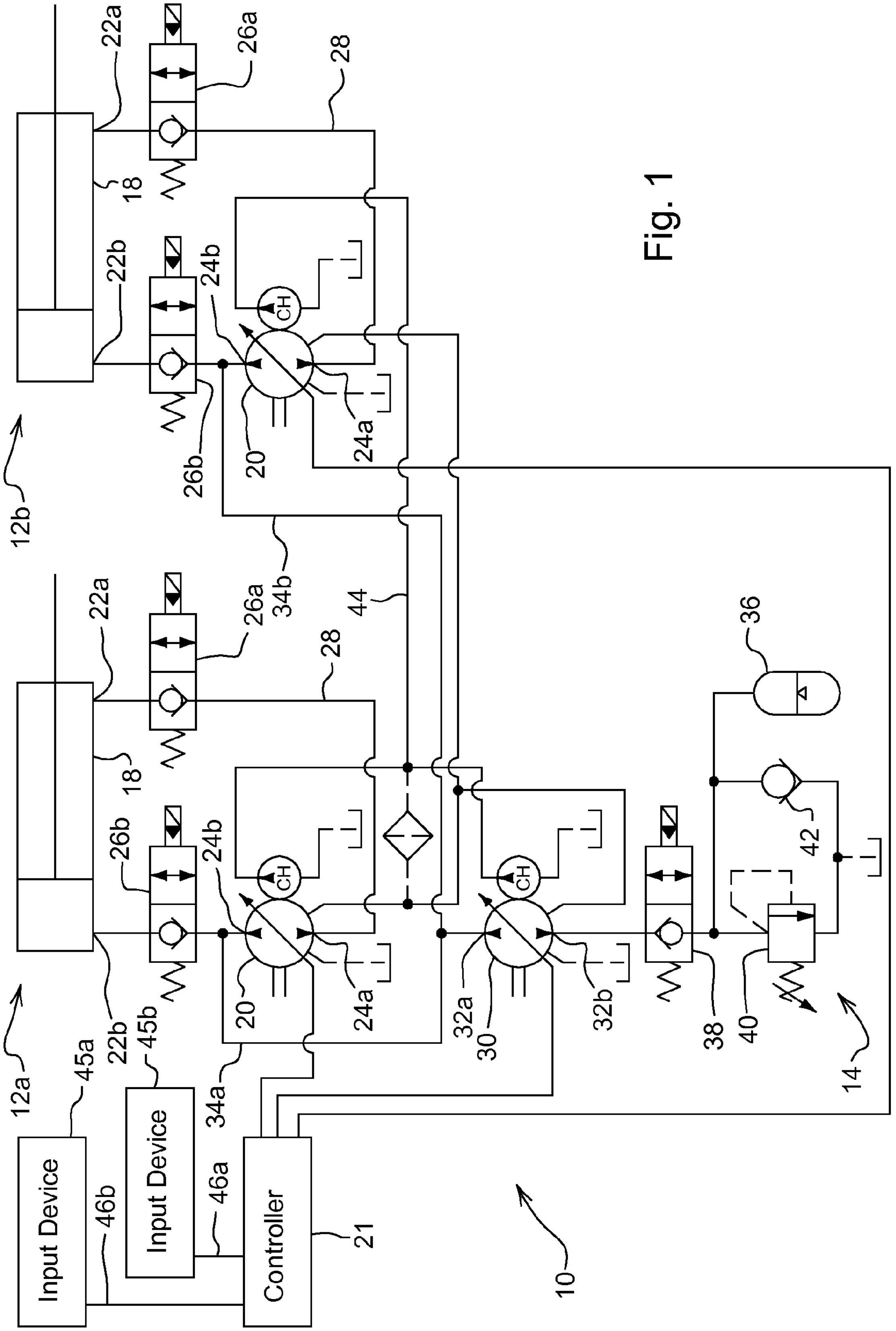
FIG. 1 is a schematic view of a hydraulic system with a plurality of primary hydraulic circuits (two, in this example) and a secondary hydraulic circuit for satisfying flow continuity of the primary hydraulic circuits.
Figure 2:
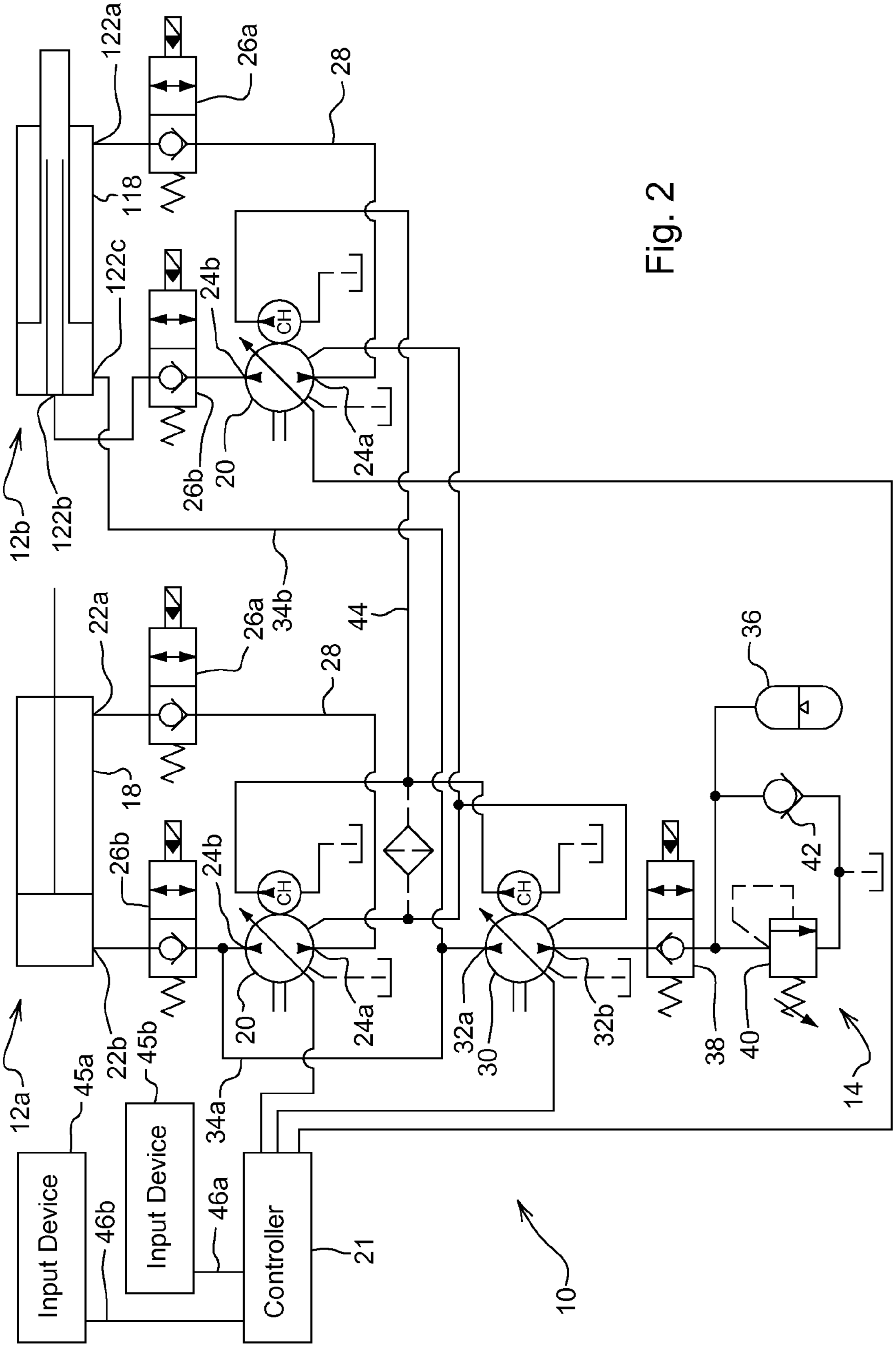
FIG. 2 is a schematic view of an alternative hydraulic system.

Referring to FIGS. 1 and 2, a hydraulic system 10 comprises a plurality of primary hydraulic circuits 12*a*, 12*b* and a secondary hydraulic circuit 14 for satisfying flow continuity of the primary hydraulic circuits 12*a*, 12*b*. Although the system 10 is illustrated as having two primary hydraulic circuits 12*a*, 12*b*, it could just as well have more than two, each being serviced by the secondary hydraulic circuit 14 for purposes of flow continuity.

Each primary hydraulic circuit 12*a*, 12*b* comprises an actuator 18 and a bi-directional variable displacement primary pump 20 under the control of a controller 21 for directing hydraulic flow between ports 22*a*, 22*b* of the actuator 18. Each circuit 12*a*, 12*b* may have only one actuator 18 or more than one actuator 18, all serviced by the primary pump 20. In the embodiment of FIG. 1, each actuator 18 is, for example, a two-chambered hydraulic cylinder having rod and head ports 22*a*, 22*b*. A first port 24*a* of the pump 20 is fluidly coupled to the rod port 22*a* via a locking valve 26*a*, and a second port 24*b* of the pump 20 is fluidly coupled to the head port 22*b* via a locking valve 26*b*. As such, the pump 20 is positioned fluidly between the ports 22*a*, 22*b* in the hydraulic line 28 connecting the ports 22*a*, 22*b*. The pump 20 may be driven by the engine of a work machine comprising the hydraulic system 10.

In the embodiment of FIG. 2, the actuator of the primary hydraulic circuit 12*b* may be a three-chambered hydraulic cylinder 118, having a rod port 122*a*, a first head port 122*b*, and a second head port 122*c*. In such a case, the first port 24*a* of the pump 20 of the circuit 12*b* is fluidly coupled to the rod port 122*a* via the locking valve 26*a*, and the second port 24*b* of the pump 20 of the circuit 12*b* is fluidly coupled to the first head port 122*b* via the locking valve 26*b*. In this way, the pump 20 of the circuit 12*b* is positioned fluidly between the ports 122*a*, 122*b* in the hydraulic line 28 connecting the ports 122*a*, 122*b*.

Employment of a three-chambered hydraulic cylinder 118, as in the embodiment of FIG. 2, provides additional control when the actuator of one primary hydraulic circuit is working against a load at high pressures, but the actuator of the other primary hydraulic circuit is attempting to move in the opposite direction (one is extending, one is retracting). If no load is required in the opposite direction for the low-pressure actuator (or there is an overrunning load), that actuator can be moved with a very small pressure differential, such that there is no loss of movement of the actuators.

The secondary hydraulic circuit 14 is fluidly coupled to each primary hydraulic circuit 12*a*, 12*b*. The secondary hydraulic circuit 14 comprises a bi-directional variable displacement secondary pump 30, which may be driven by the engine of the work machine comprising the hydraulic system 10. The pump 30 is also under the control of the controller 21.

The pump 30 has a port 32*a* fluidly coupled to the primary hydraulic circuit 12*a* via a hydraulic line 34*a* at a point between the port 24*b* of the primary pump 20 of the circuit 12*a* and the locking valve 26*b* of the circuit 12*a*. The port 32*a* of the pump 30 is further fluidly coupled to the primary hydraulic circuit 12*b* via a hydraulic line 34*b*. In particular, in the embodiment of FIG. 1, the port 32*a* is fluidly coupled to the primary hydraulic circuit 12*b* via the hydraulic line 34*b* at a point between the port 24*b* of the primary pump 20 of the circuit 12*b* and the locking valve 26*b* of the circuit 12*b*, whereas, in the embodiment of FIG. 2, the port 32*a* is fluidly coupled to the second head port 122*c* of the actuator 118 of the primary hydraulic circuit 12*b* via the hydraulic line 34*b*.

The secondary hydraulic circuit 14 further includes an accumulator 36 or other fluid storage element for temporarily storing excess hydraulic fluid from the primary hydraulic circuits, and releasing such fluid back to the primary hydraulic circuits when needed, as discussed in more detail below. A locking valve 38 is positioned fluidly between the accumulator 36 and a port 32*b* of the secondary pump 30 to prevent fluid leakage out of the accumulator 36 and through the pump 30 to a hydraulic fluid reservoir (which would undesirably remove hydraulic fluid from the circuit 14).

The secondary hydraulic circuit 14 also includes a pressure-relief valve 40 and a check valve 42 in parallel with one another. Such an arrangement prevents the accumulator 36 from experiencing excessive pressures. In the event of such an excessive pressure, the pressure-relief valve 40 opens to drain hydraulic fluid to the hydraulic fluid reservoir. Further, in the event of a fluid shortage in the circuit 14, the check valve 42 can provide low-pressure fluid from the hydraulic fluid reservoir to refill the circuit 14.

A charge circuit 44 maintains an appropriate hydraulic pressure within the circuits 12*a*, 12*b*, 14 in the event of, for example, leakage within the circuits 12*a*, 12*b*, 14. Exemplarily, the charge circuit 44 has a charge pump ("CH" in the drawings) attached to each primary pump 20 and the secondary pump 30 to provide this hydraulic pressure.

The controller 21 is provided for communication with the primary hydraulic circuits 12*a*, 12*b* and the secondary hydraulic circuit 14. In general, the controller 21 is adapted to determine a flow continuity requirement of each primary hydraulic circuit 12*a*, 12*b* and control the direction and displacement of the secondary pump 30 so as to complement operation of each primary pump 20 in a manner that satisfies the flow continuity requirement of each primary hydraulic circuit 12*a*, 12*b*.

The controller 21 is responsive to operation of input devices 45*a*, 45*b* to control the primary pumps 20 and the secondary pump 30. Each input device 32*a*, 32*b* is associated with one of the primary hydraulic circuits 12*a*, 12*b* and is operable to provide an input signal 46*a*, 46*b* representative of a request for a direction and speed of actuation of the actuator 18 (or 118 as the case may be) of the respective primary hydraulic circuit 12*a*, 12*b*. As such, each input device 32*a*, 32*b* may include an operator interface (e.g., joystick) and a sensor for sensing the displacement and direction of displacement of the operator interface and generating the corresponding input signal 46*a*, 46*b* received by the controller 21.

Figure 3:
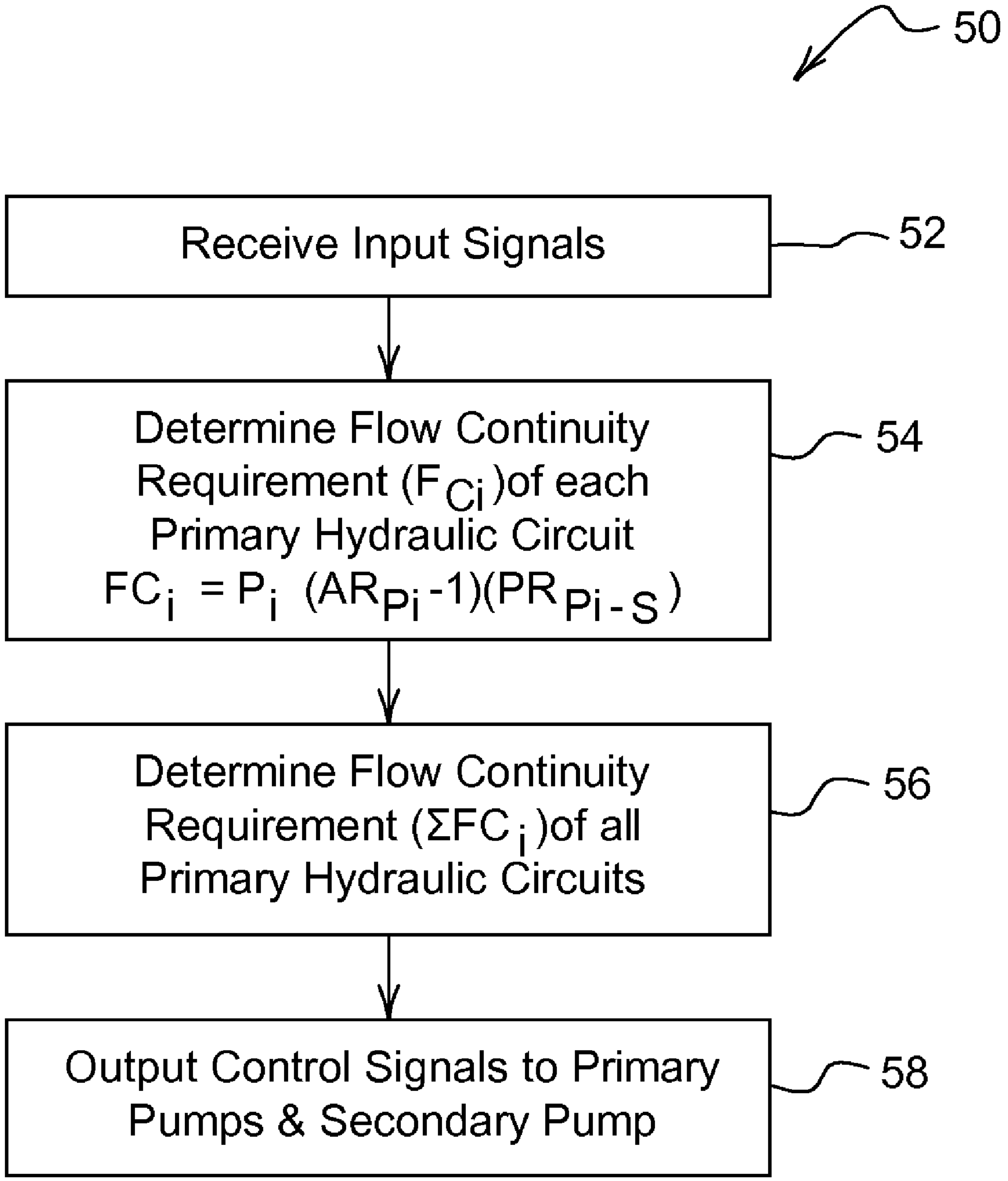
FIG. 3 is a control routine for operation of the hydraulic systems of FIGS. 1 and 2.

Referring to the control routine 50 of FIG. 3, in act 52, the controller 21 receives the input signals 46*a*, 46*b* from the input devices 45*a*, 45*b*. In particular, the controller 21 receives the input signals 46*a*, 46*b* from the sensors of the input devices 45*a*, 45*b*.

In act 54, the controller 21 determines the flow continuity requirement ($FC_i$) of each primary hydraulic circuit 12*a*, 12*b* using the respective input signal 46*a*, 46*b*. More particularly, the controller 21 determines a direction and displacement for the primary pump 20 of each primary hydraulic circuit 12*a*, 12*b* using the respective input signal 46*a*, 46*b*, wherein the direction demanded of the actuator and represented by the input signal corresponds to the direction to be demanded of the pump 20 and the displacement demanded of the actuator and represented by the input signal corresponds to the direction to be demanded of the pump 20.

This primary pump direction and displacement ($P_i$) may be represented quantitatively by a "signed percentage" (i.e., +/−%), wherein the sign (+/−) represents the direction of operation of the pump 20 and the percentage (%) represents the percentage of maximum displacement of the pump 20.

The flow continuity requirement ($FC_i$) of each primary hydraulic circuit 12*a*, 12*b* is determined according to the following relationship: $FC_i = P_i(AR_{Pi}-1)(PR_{Pi\text{-}S})$, where, i represents an index identification number of each primary hydraulic circuit 12*a*, 12*b*, $FC_i$ represents the flow continuity requirement of the respective primary hydraulic circuit 12*a*, 12*b*, $P_i$ represents the direction and displacement demanded of the primary pump 20 of the respective primary hydraulic circuit 12*a*, 12*b*, $AR_{Pi}$ represents an area ratio between head and rod sides of the actuator 18 (or 118) of the respective primary hydraulic circuit 12*a*, 12*b* (i.e., head side area/rod side area, wherein the rod side area is the area of the annulus around the rod, which may be referred to herein as the "rod annulus area"), and $PR_{Pi\text{-}S}$ represents a maximum pump displacement ratio between maximum primary pump displacement of the respective primary hydraulic circuit 12*a*, 12*b* and maximum secondary pump displacement of the secondary hydraulic circuit 14 (i.e., maximum primary pump displacement/maximum secondary pump displacement).

As discussed in more detail below, any of the primary hydraulic circuits 12*a*, 12*b* and/or the secondary hydraulic circuit 14 may have a single pump or multiple pumps in parallel. Each maximum pump displacement ratio ($PR_{Pi\text{-}S}$) would thus be a function of the displacement of the respective primary pump(s) 20 and the secondary pump(s) 30. More particularly, the maximum primary pump displacement (i.e., the numerator of $PR_{Pi\text{-}S}$) would be the total maximum displacement of the primary pump(s) 20 of the respective primary hydraulic circuit 12*a*, 12*b*, and the maximum secondary pump displacement would be the total maximum displacement of the secondary pump(s) 30 of the secondary hydraulic circuit 14.

In act 56, the controller 21 determines a net flow continuity requirement using the flow continuity requirements ($\Sigma FC_i$) of the primary hydraulic circuits 12*a*, 12*b*. The controller 21 sums the flow continuity requirements ($FC_i$) to obtain the net flow continuity requirement ($\Sigma FC_i$). The net flow continuity requirement is thus also a signed percentage, and this signed percentage represents the direction and displacement to be demanded of the secondary pump 30 so as to satisfy the net flow continuity requirement ($\Sigma FC_i$). More particularly, the sign (+/−) of the net flow continuity requirement ($\Sigma FC_i$) represents the direction of operation to be demanded of the pump 30 and the percentage (%) of the net flow continuity requirement ($\Sigma FC_i$) represents the percentage of maximum displacement of pump 30 to be demanded of pump 30.

In act 58, the controller 21 outputs control signals to the primary pumps 20 and the secondary pump 30. In particular, the controller 21 outputs a primary pump control signal ($P_i$) to each primary pump 20 commanding the direction and displacement of such pump 20, and outputs a secondary pump control signal ($P_s$) to the secondary pump 30 commanding the direction and displacement of the secondary pump 30 so as to satisfy the net flow continuity requirement ($\Sigma FC_i$).

More particularly, the secondary pump control signal exemplarily represents both the secondary pump command ($P_S$) commanding the direction and displacement of the secondary pump 30 and the net flow continuity requirement ($\Sigma FC_i$) such that $P_S=\Sigma FC_i$, since no mathematical conversions are needed to arrive at the secondary pump command ($P_S$) from the net flow continuity requirement ($\Sigma FC_i$). In other words, the secondary pump control signal represents the signed percentage of both the secondary pump command ($P_S$) and the net flow continuity requirement ($\Sigma FC_i$), wherein, as noted above, the sign (+/−) represents the direction of operation of the pump 30 and the percentage (%) represents the percentage of maximum displacement of pump 30 demanded of pump 30.

Figure 4:
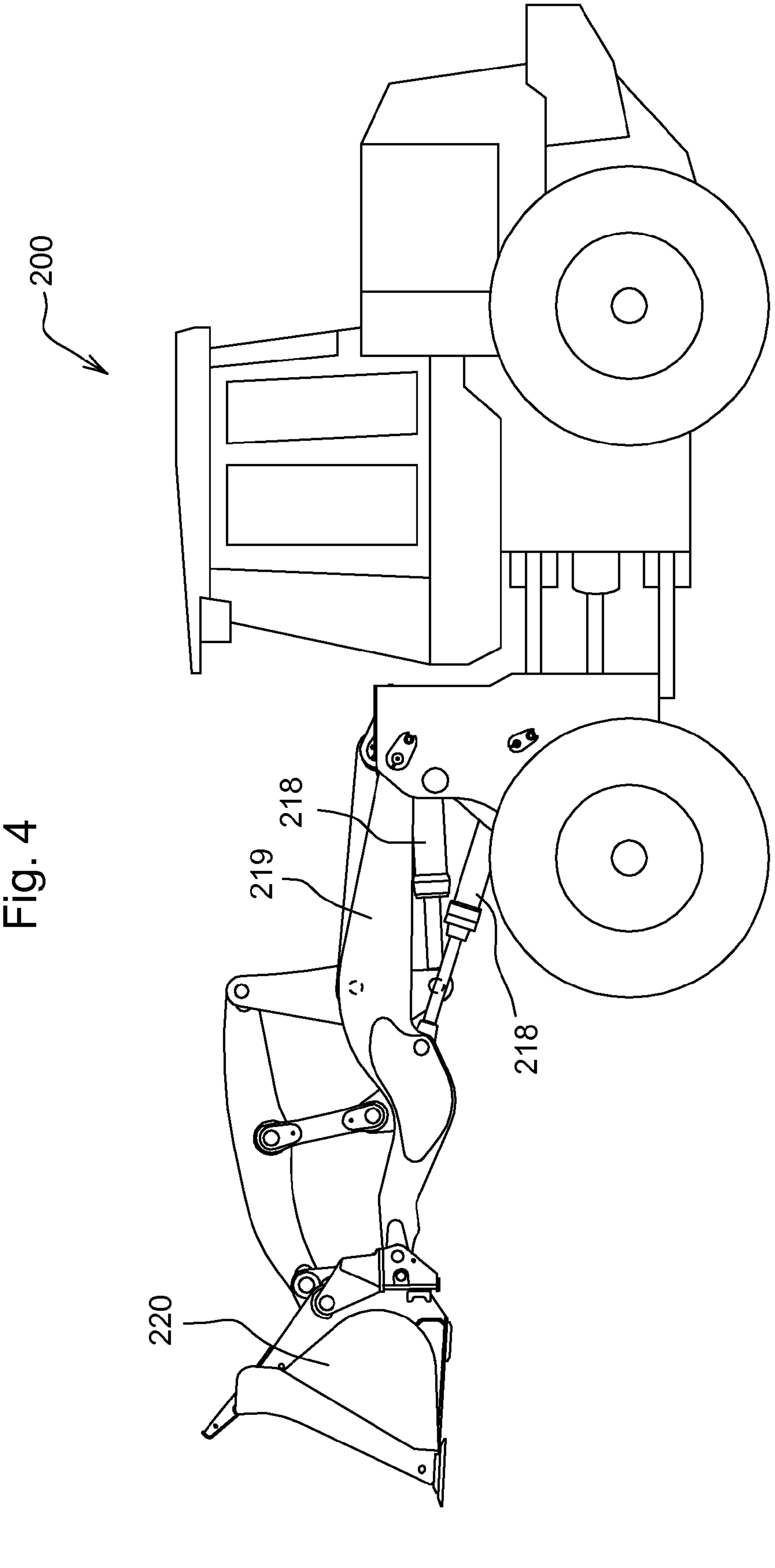
FIG. 4 is a side elevation view of a four-wheel drive loader having functions which may be under the control of the hydraulic system of either FIG. 1 or 2.

Referring to FIG. 4, the hydraulic system 10 may be used on a variety of work machines, such as a four-wheel drive loader 200. The system 10 may either take the form of the embodiment of FIG. 1 or the embodiment of FIG. 2 on the work machine. As alluded to above, one or both hydraulic circuits 12*a*, 12*b* may have only one actuator 18 (or 118) or more than one actuator 18 (or 118). Exemplarily, the primary hydraulic circuit 12*a* of the loader 200 has two actuators, i.e., left and right hydraulic boom-lift cylinders 218 (the left cylinder being shown in FIG. 4) for raising and lowering a boom 219, and the primary hydraulic circuit 12*b* has a single hydraulic bucket cylinder 218 for pivoting a bucket 220 fore and aft. The cylinders may be two- or three-chambered.

Any primary hydraulic circuit 12*a* and/or 12*b* may have a single primary pump 20 that serves the actuator(s) 18 (or 118) of the respective primary hydraulic circuit or multiple primary pumps 20 in parallel (i.e., a primary pump group) that collectively serve the actuator(s) 18 (or 118) of the respective primary hydraulic circuit. In the case where a primary hydraulic circuit 12*a*, 12*b* has multiple primary pumps 20 in parallel, the primary pump control signal ($P_i$) of that primary hydraulic circuit would represent the signed percentage of the primary pump group of that circuit, the sign representing the direction of operation of the primary pump group and the percentage representing the total displacement of all the primary pumps 20 of that primary pump group. In this case, the maximum displacements of the primary pumps 20 of that primary pump group would be summed to arrive at the maximum pump displacement of that primary pump group. This maximum pump displacement would be the numerator in the respective maximum pump displacement ratio ($PR_{Pi-s}$).

The secondary hydraulic circuit 14 may have a single secondary pump 30 that serves all the primary hydraulic circuits or multiple secondary pumps 30 in parallel (i.e., a secondary pump group) that collectively serve all the primary hydraulic circuits. In the case where the secondary hydraulic circuit 14 has multiple secondary pumps 30 in parallel, the secondary pump control signal ($P_S$) would represent the signed percentage of the secondary pump group, the sign representing the direction of operation of the secondary pump group and the percentage representing the total displacement of all the secondary pumps 30. In this case, the maximum displacements of all the secondary pumps 20 would be summed to arrive at the maximum pump displacement of the secondary pump group. This maximum pump displacement would be the denominator in each maximum pump displacement ratio ($PR_{Pi-s}$).

The pumps 20, 30 of the primary and secondary hydraulic circuits 12*a*, 12*b*, 14 rotate at the same speed. This is because they spin off the same shaft from the engine of the work machine.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method, comprising:

determining a flow continuity requirement of each primary hydraulic circuit of a plurality of primary hydraulic circuits, each primary hydraulic circuit comprising an actuator and a bi-directional variable displacement primary pump for directing hydraulic flow between ports of the actuator, and controlling the direction and displacement of a bi-directional variable displacement secondary pump of a secondary hydraulic circuit fluidly coupled to each primary hydraulic circuit so as to complement operation of each primary pump in a manner that satisfies the flow continuity requirement of each primary hydraulic circuit.

2. The method of claim 1, wherein the determining comprises summing the flow continuity requirements to obtain a net flow continuity requirement, and the controlling comprises controlling the direction and displacement of the secondary pump so as to satisfy the net flow continuity requirement.

3. The method of claim 1, comprising receiving a plurality of input signals, wherein the determining comprises determining the flow continuity requirement of each primary hydraulic circuit using one of the input signals and determining a net flow continuity requirement using the flow continuity requirements of the primary hydraulic circuits, and the controlling comprises outputting a control signal commanding operation of the secondary pump so as to satisfy the net flow continuity requirement.

4. The method of claim 1, comprising receiving a plurality of input signals, wherein each input signal is representative of a request for a direction and speed of actuation of the actuator of a respective one of the primary hydraulic circuits, the determining comprises determining a direction and displacement for the primary pump of each primary hydraulic circuit using the respective input signal and determining a net flow continuity requirement as a sum of the flow continuity requirements of the primary hydraulic circuits using the direction and displacement of each primary pump, and the controlling comprises outputting a primary pump control signal to each primary pump commanding its direction and displacement and a secondary pump control signal to the secondary pump commanding its direction and displacement to satisfy the net flow continuity requirement.

5. The method of claim 1, wherein the flow continuity requirement of each primary hydraulic circuit is represented by the relationship:

$$FC_i=P_i(AR_{Pi}-1)(PR_{Pi-S})$$

where, i represents an index identification number of each primary hydraulic circuit, $FC_i$ represents the flow continuity requirement of the respective primary hydraulic circuit, $P_i$ represents the direction and displacement demanded of the primary pump of the respective primary hydraulic circuit, $AR_{Pi}$ represents an area ratio between head and rod sides of the actuator of the respective primary hydraulic circuit, and $PR_{Pi-S}$ represents a maximum pump displacement ratio between primary pump displacement of the respective primary hydraulic circuit and secondary pump displacement of the secondary hydraulic circuit, the determining comprises summing the flow continuity requirements ($FC_i$) to obtain a net flow continuity requirement ($\Sigma FC_i$), and the controlling comprises outputting a secondary pump control signal representative of the net flow continuity requirement ($\Sigma FC_i$) so as to command the direction and displacement of the secondary pump in a manner that satisfies the net flow continuity requirement ($\Sigma FC_i$).

6. The method of claim 1, wherein the determining comprises using an area ratio between head and rod sides of the actuator of each primary hydraulic circuit.

7. The method of claim 1, wherein the determining comprises using a maximum pump displacement ratio between the primary pump of each primary hydraulic circuit and the secondary pump.

8. The method of claim 1, wherein the determining comprises using the direction and displacement demanded of each primary pump.

9. The method of claim 1, wherein the second hydraulic circuit comprises an accumulator, and the controlling comprises operating the accumulator.

10. A hydraulic system, comprising:

a plurality of primary hydraulic circuits, each primary hydraulic circuit comprising an actuator and a bi-directional variable displacement primary pump for directing hydraulic flow between ports of the actuator, a secondary hydraulic circuit fluidly coupled to each primary hydraulic circuit, the secondary hydraulic circuit comprising a bi-directional variable displacement secondary pump, and a controller for communication with the primary hydraulic circuits and the secondary hydraulic circuit, the controller adapted to:

determine a flow continuity requirement of each primary hydraulic circuit, and control the direction and displacement of the secondary pump so as to complement operation of each primary pump in a manner that satisfies the flow continuity requirement of each primary hydraulic circuit.

11. The hydraulic system of claim 10, wherein the controller is adapted to sum the flow continuity requirements to obtain a net flow continuity requirement and control the direction and displacement of the secondary pump so as to satisfy the net flow continuity requirement.

12. The hydraulic system of claim 10, wherein the controller is adapted to receive a plurality of input signals, determine the flow continuity requirement of each primary hydraulic circuit using one of the input signals, determine a net flow continuity requirement using the flow continuity requirements of the primary hydraulic circuits, and output a control signal commanding operation of the secondary pump so as to satisfy the net flow continuity requirement.

13. The hydraulic system of claim 10, comprising a plurality of input devices, wherein each input device is associated with one of the primary hydraulic circuits and is operable to provide an input signal representative of a request for a direction and speed of actuation of the actuator of the respective primary hydraulic circuit, and the controller is adapted to determine a direction and displacement for the primary pump of each primary hydraulic circuit using the respective input signal, determine a net flow continuity requirement as a sum of the flow continuity requirements of the primary hydraulic circuits using the direction and displacement of each primary pump, and output a primary pump control signal to each primary pump commanding its direction and displacement and a secondary pump control signal to the secondary pump commanding its direction and displacement to satisfy the net flow continuity requirement.

14. The hydraulic system of claim 10, wherein the controller is programmed such that the flow continuity requirement of each primary hydraulic circuit is represented by the relationship:

$$FC_i=P_i(AR_{Pi}-1)(PR_{Pi-S})$$

where, i represents an index identification number of each primary hydraulic circuit, $FC_i$ represents the flow continuity requirement of the respective primary hydraulic circuit, $P_i$ represents the direction and displacement demanded of the primary pump of the respective primary hydraulic circuit, $AR_{Pi}$ represents an area ratio between head and rod sides of the actuator of the respective primary hydraulic circuit, and $PR_{Pi-S}$ represents a maximum pump displacement ratio between primary pump displacement of the respective primary hydraulic circuit and secondary pump displacement of the secondary hydraulic circuit, the controller is adapted to sum the flow continuity requirements ($FC_i$) to obtain a net flow continuity requirement ($\Sigma FC_i$) and output a secondary pump control signal representative of the net flow continuity requirement ($\Sigma FC_i$) so as to command the direction and displacement of the secondary pump in a manner that satisfies the net flow continuity requirement ($\Sigma FC_i$).

15. The hydraulic system of claim 10, wherein the controller is adapted to use an area ratio between head and rod sides of the actuator of each primary hydraulic circuit in the determination of the flow continuity requirements.

16. The hydraulic system of claim 10, wherein the controller is adapted to use a maximum pump displacement ratio between the primary pump of each primary hydraulic circuit and the secondary pump in the determination of the flow continuity requirements.

17. The hydraulic system of claim 10, wherein the controller is adapted to use the direction and displacement demanded of each primary pump in the determination of the flow continuity requirements.

18. The hydraulic system of claim 10, wherein the secondary hydraulic circuit comprises an accumulator.

19. The hydraulic system of claim 10, wherein the actuator of a first of the primary hydraulic circuits is a two-chambered actuator, and the actuator of a second of the primary hydraulic circuits is a two-chambered actuator.

20. The hydraulic system of claim 10, wherein the actuator of a first of the primary hydraulic circuits is a two-chambered actuator, and the actuator of a second of the primary hydraulic circuits is a three-chambered actuator.

* * * * *